Nov. 4, 1969   W. J. KUDLATY   3,476,251
FILTER AND HOUSING STRUCTURE
Filed May 4, 1966
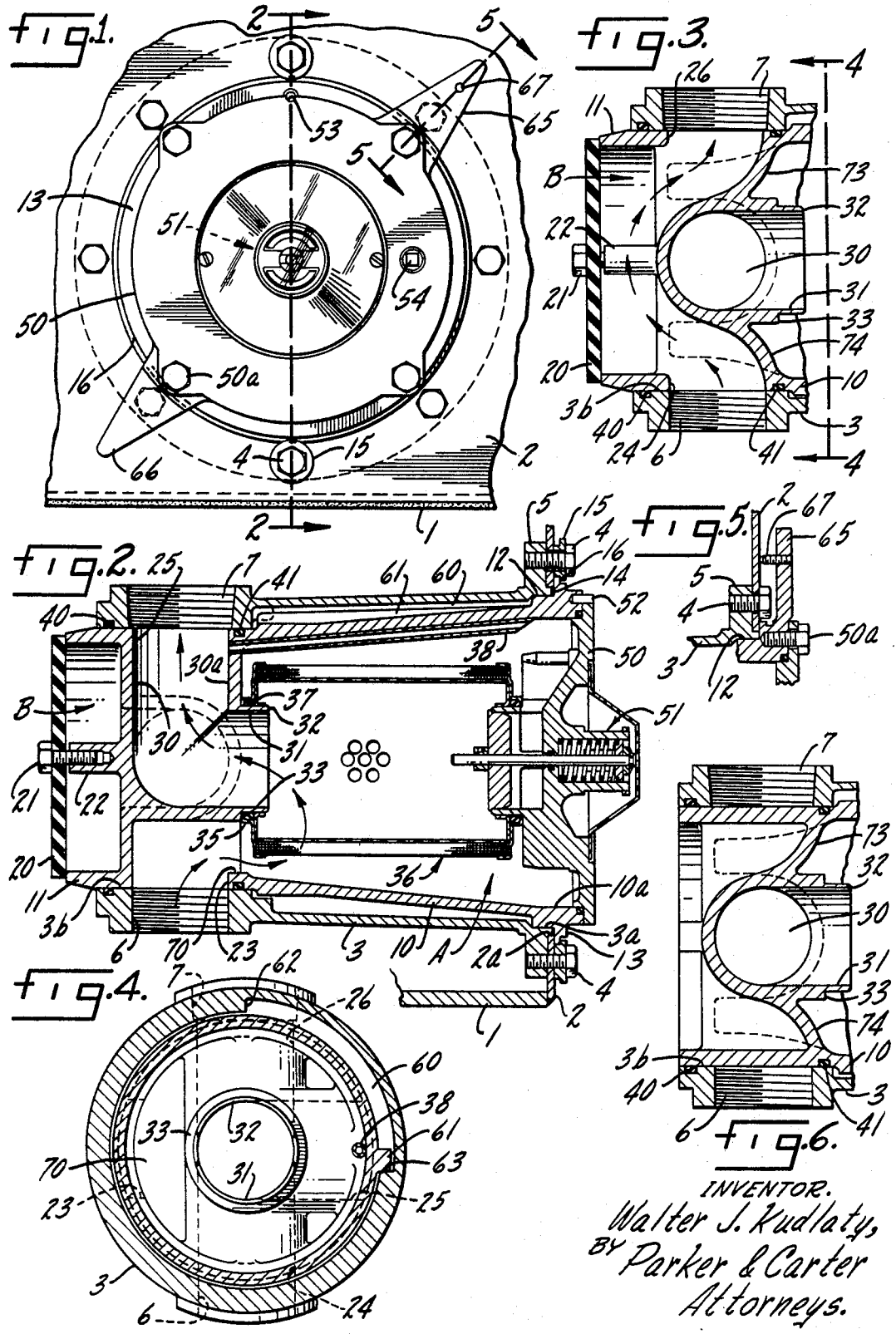
INVENTOR.
Walter J. Kudlaty,
BY Parker & Carter
Attorneys.

United States Patent Office 3,476,251
Patented Nov. 4, 1969

3,476,251
FILTER AND HOUSING STRUCTURE
Walter J. Kudlaty, Elmhurst, Ill., assignor to Marvel Engineering Company, Chicago, Ill., a corporation of Illinois
Filed May 4, 1966, Ser. No. 547,513
Int. Cl. B01d 33/06
U.S. Cl. 210—232                                  6 Claims

ABSTRACT OF THE DISCLOSURE

A filter and housing structure wherein a hollow tubular external housing has an inlet and outlet and a substantially circumferential inner housing is rotatable in said external housing. The internal housing has a filtering chamber and, in one form, a bypass chamber, each of said chambers having its own inlet and outlet, the inlets and outlets of said filtering and bypass chambers being alternatively alignable with the inlet and outlet of said external housing in response to rotation of said internal housing. A filter member is carried in the filtering chamber between its inlet and outlet and a closure plate closes an end of the filtering chamber, the plate being removable for removal and cleaning of the filter member when the inlets and outlets of said bypass chamber are in communication with the inlet and outlet of said external housing or when flow is completely stopped.

---

This invention relates to filters and has particular relation to a filter and housing assembly including means effective to provide filter element replacement.

One purpose of the invention is to provide a filter assembly including housing means effective to permit continued equipment operation during cleaning or replacement of the filter element of the assembly.

Another purpose is to provide a filter assembly including a fixed housing, a rotatable housing and a filter element.

Another purpose is to provide assured means of continued equipment operation during replacement of a filter element.

Another purpose is to provide means for positively controlling the flow of fluid alternately through and around a filter element.

Another purpose is to provide a filter assembly including simplified, yet positive means for continued equipment operation during element cleaning or replacement and formed of a minimum number of parts and of maximum economy in manufacture.

Another purpose is to provide a filter assembly including positive bypass means of maximum simplicity in manufacture and use.

Other purposes will appear from time to time during the course of the specification and claims.

The invention is illustrated more or less diagrammatically in the accompanying drawings, wherein:

FIGURE 1 is an end view;
FIGURE 2 is a side view in cross section taken on the line 2—2 of FIGURE 1;
FIGURE 3 is a partial side view in cross section with the parts shown in another position;
FIGURE 4 is a view taken on the line 4—4 of FIGURE 3;
FIGURE 5 is a partial sectional view taken on the line 5—5 of FIGURE 1; and
FIGURE 6 is a partial sectional view of an alternate form of the invention.

Like parts are indicated by like numerals throughout the specification and drawings.

Referring now to the drawings, the filter assembly of the invention is illustrated as installed, for example, in a tank or reservoir containing fluid to be filtered. In such installation the assembly of the invention serves as a submerged suction filter. It will be realized, however, that the principle of the invention and the assembly shown herein may be employed in other filtering environments without departing from the nature and scope of the invention.

The numeral 1 indicates a bottom wall (partially shown) of a reservoir or tank. Indicated (partially) at 2 is an end wall thereof. The assembly of the invention includes an external housing 3 having an open end 3a secured within opening 2a of wall 2 by any suitable means, such as by the fasteners 4 securing the annular flange 5 to wall 2. The housing 3 may be generally cylindrical in lateral cross-sectional configuration. Whatever may be the overall configuration of the housing 3, the opening 3a at one end thereof and the opening 3b at the opposite end thereof are circular. It has been found preferable to form the coaxial openings 3a, 3b of differing diameters, with the opening 3b having a diameter somewhat less than that of the opening 3a. A fluid inlet 6 is formed in the housing 3 adjacent the open end 3b and a fluid outlet 7, preferably coaxial with the inlet 6, is formed, in diametrically opposed relation to the inlet 6, in the housing 3.

Rotatably mounted within the first or outer housing 3 is a second or inner housing 10. A conical external wall surface 11 at one end of the housing 10 facilitates its centering and insertion through the opening 3b. With the housing 10 fully inserted in housing 3, as can be clearly seen in FIGURE 2, a circumferential external surface 12 seats within the opening 3a and an annular flange 13 on housing 10 abuts the wall 2 and may also abut an end surface of the housing 3 as indicated at 14. Shouldered washers 15 are positioned by fasteners 4 and engage a reduced annular flange portion of the flange 13 as indicated at 16.

The housing 10 defines a filtering chamber A and a bypass chamber B. A closure plate 20 is held by a fastener 21 engaging a boss 22 to define with adjacent portions of the housing 10, the chamber B. A first inlet 23 is formed in the housing 10 and communicates with chamber A. It will be observed that the inlet 23 is positioned in the wall of housing 10 for alignment with the inlet 6 of housing 3 when the housing 10 is at one fully inserted, rotational position in the housing 3. A second inlet 24, best seen in FIGURE 3, is circumferentially spaced from inlet 23 in the wall of housing 10 and communicates with the chamber B, the inlet 24 being positioned in the wall of housing 10 for alignment with the inlet 6 of housing 3 when the housing 10 is in another fully inserted, rotational position within housing 3.

An outlet 25 is formed in the wall of housing 10 and communicates with chamber A, the outlet 25 being positioned in housing 10 for alignment with the outlet 7 of housing 3 when the housing 10 is in said one position within housing 3. A second outlet 26 is circumferentially spaced in the wall of housing 10 from outlet 25 and communicates with chamber B, the outlet 26 being positioned for alignment with the outlet 7 of housing 3 when the housing 10 is in said other position within the housing 3.

As may be best seen in FIGURE 2, the outlet 25 communicates with the chamber A through an L-shaped passage 30, the inner end 31 of which is defined by a sleeve 32 coaxial with the housing 10. An abutment surface 33 is associated with sleeve 32 to serve as a stop means for the end 35 of a filter element 36, the seal 37 carried by the filter element engaging the external surface of sleeve 32, the filter element occupying a substantial portion of chamber A and ensuring that fluid delivered to chamber A through inlet 23 must pass through the filter 36 in order to enter the outlet passage 30. An air diffuser tube 38 is carried within housing 10 to direct any air trapped in the uppermost portion of the chamber A to the outlet passage 30 and thus to outlet 25.

Seal rings 40, 41 are carried by the housings 3 and 10, respectively, for sealing engagement with opposed portions of the housings on opposite sides of the inlets 6, 23, 24 and outlets 7, 25, 26.

Positioned within the open end 10a of the housing 10 is a closure plate or cap 50 carrying the valve and indicator structure indicated generally by the numeral 51, the details of which form no part of the present invention, but which may be fully understood by reference to the copending application, Ser. No. 358,761, filed Apr. 10, 1964, and entitled "Filter," now Patent No. 3,342,332. Features disclosed herein and not in said prior application, however, are the positive locator pin 52 engaging the outer end surface of the housing 10 and a notch 53 in the cap 50 and the drain plug 54 removably carried by cap 50.

The housing 3 has an arcuate recess 60, perhaps best seen in FIGURE 4, in the inner wall surface thereof. The housing 10 carries a radially extending finger or abutment member 61 for movement within the recess 60, the end surfaces 62, 63 of the recess 60 serving as positive stop abutment means for the element 61.

As may be best seen in FIGURES 1 and 5, the flange 13 of housing 10 carries outwardly, radially extending handle portions 65, 66, the handle portions extending in diametrically opposed directions. A spring plunger assembly 67 is carried by handle portion 65 and engages the wall 2 for frictional retention of the handle 65, and thus of the housing 10, in the desired position.

In the form of FIGURE 6, inlet 24 and outlet 26 are closed and plate 20 has been discarded.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

It has been found convenient to form the arcuate recess 60 through an arc of 90 degrees and to position the inlets 23, 24 and outlets 25, 26 in circumferentially spaced relation in housing 10 with their axes at 90 degrees from each other, it being understood that said inlets and outlets alternate about the circumference of housing 10. As may be best seen in FIGURES 2, 3 and 4, the desired result may be accomplished most simply with a single casting wherein inlet 23 communicates with chamber A through a crescentlike opening 70. Web portions 73, 74 seal off inlet 24, outlet 26 and bypass chamber B from chamber A when the housing 10 is in the bypass position. It will be realized that the inlet 24 and outlet 26 are closed against the inner wall surface of housing 3 when the parts are as shown in FIGURE 2 and that the inlet 23 and outlet 25 are closed against said inner wall surface of housing 3 when the parts are in the position shown in FIGURES 3 and 4.

With the parts in normal operating position, as shown in FIGURES 1 and 2, fluid to be filtered enters inlet 6, flows through inlet 23 and opening 70 into chamber A. Thereafter the fluid flows through the filter element 36, sleeve 32, passage 30 and outlets 25 and 7 for delivery to the equipment in operation requiring the thus-filtered fluid. Air entrapped in the uppermost part of housing 10 is bled through tube 38. For a fuller understanding of the operation of tube 38, reference may be had to application, Ser. No. 494,460, filed Oct. 11, 1965, and entitled "Apparatus for Removing Entrapped Air in Filters," now Patent No. 3,384,242.

If the filter element 36 should become clogged to an extent productive of a predetermined, undesirable pressure differential, the valve of the structure 51 will open and fluid will bypass the filter element 36, flowing through the central core thereof for delivery through passage 30 as above described. In such event, the indicator elements of the structure 51 will signal the difficulty. Thereupon the operator rotates handles 65, 66 in a clockwise direction through an arc of 90 degrees. This action rotates the housing 10 into the position shown partially in FIGURES 3 and 4, bringing the finger 61 against abutment stop surface 63 and rotating inlet 23 and outlet 25 into closed position against the inner surface of housing 3 while simultaneously and positively positioning inlet 24 and outlet 26 in alignment with the inlet 6 and outlet 7, respectively, of housing 3. Thereafter the fluid entering inlet 6 will flow through bypass chamber B and outwardly through outlets 26 and 7 to the pump and equipment, thus maintaining the uninterrupted operation of said equipment.

Rotation of housing 10 through said arc of 90 degrees positions drain plug 54 at the lowermost point of housing 10. The drain plug is then removed to drain any fluid remaining in chamber A and replaced. Thereafter the cap structure 50 and element 36 are removed, the fasteners 50a, which hold the cap 50 on housing 10, being removed for this purpose. The filter element 36 is then cleaned or replaced, the filter element, cap 50 and structure 51 are reassembled in housing 10 and the handle members 65, 66 are operated to rotate the housing 10 back into the position shown in FIGURES 1 and 2, automatically returning the flow of fluid through chamber A, filter element 36 and outlets 25, 7 to the pump and sealing off the inlet 24, bypass chamber B and outlet 26 against the inner surface of housing 3.

In the form of FIGURE 6 rotation of housing 10 moves the side wall thereof across inlet 6 and outlet 7 to preclude flow of fluid to a pump and to equipment requiring filtered fluid. It will be realized that such equipment may have been previously shut down or suitable switch means (not shown) may be provided for actuation upon rotation of handles 65, 66 to deactivation of such equipment. The operation of the structure of FIGURE 6 is substantially identical to that of FIGURES 1–5 with respect to removal and replacement of filter element 36, the structure of FIGURE 6 being employed in those instances in which continued equipment operation during such removal and replacement is not desired.

There is claimed:

1. A filter assembly including a substantially cylindrical external housing having an open end and an inlet and an outlet, a substantially cylindrical internal housing within said external housing and constructed and arranged to rotate in said external housing, said internal housing having an inlet and an outlet and having one end which is constructed and arranged to sealingly close the open end of said external housing, a filter element carried in said internal housing between said internal housing inlet and outlet and encompassing said internal housing outlet so that fluid entering said internal housing inlet flows through said filter element enroute to said internal housing outlet, said internal housing being constructed and arranged to be rotatable into a first position communicating said internal and external housing inlets and communicating said internal and external housing outlets, said internal housing being further rotatable into a second position sealing said internal and external housing inlets from communication with each other and sealing said internal and external housing outlets from communication with each other, a closure plate sealingly closing the one end of said internal housing which sealingly closes the open end of said external housing, said plate being constructed and arranged to be removable for removal and replacement of said filter element when said internal housing is in said second position.

2. The structure of claim 1 characterized by and including a bypass chamber formed in said internal housing, a second inlet and a second outlet formed in said internal housing and communicating with said bypass chamber, said second inlet and second outlet being in communication with said external housing inlet and outlet, respectively, when said internal housing is in said second position.

3. The structure of claim 1 wherein said internal housing includes drain means formed in said plate and positioned at the lowermost point of said internal housing when said internal housing is in said second position.

4. The structure of claim 1 characterized by and including handle means formed integrally with said internal housing and extending in opposite radial directions therefrom externally of said external housing.

5. The structure of claim 1 wherein said external housing includes substantially cylindrical inner surfaces and said internal housing includes substantially cylindrical external surfaces engaging said external surfaces and rotatable therewithin and characterized by and including seal elements engaging said internal and external surfaces on opposite sides of said inlets and outlets.

6. The structure of claim 1 characterized by and including a recess in the internal surface of said external housing, an extension on the external surface of said internal housing and extending into said recess, abutment surfaces positioned at opposite ends of said recess for contact by said extension to limit rotation of said internal housing, and a handle element formed integrally with said internal housing and extending laterally therefrom externally of said external housing for manual rotation of said internal housing.

References Cited

UNITED STATES PATENTS

| 1,042,203 | 10/1912 | Dahl | 210—424 X |
| 1,202,370 | 10/1916 | Egle et al. | 210—424 |
| 1,507,806 | 9/1924 | Zeller | 210—424 |
| 1,590,128 | 6/1926 | Staples | 210—423 |
| 2,544,244 | 3/1951 | Vokes | 210—234 |
| 2,991,885 | 7/1961 | Gutkowski | 210—234 X |
| 3,312,344 | 4/1967 | Rosaen | 210—91 X |

REUBEN FRIEDMAN, Primary Examiner

W. S. BRADBURY, Assistant Examiner

U.S. Cl. X.R.

210—90, 130, 436, 420